Jan. 5, 1932.  O. F. CARPENTER  1,840,224
BROODER FRONT
Filed Feb. 24, 1930
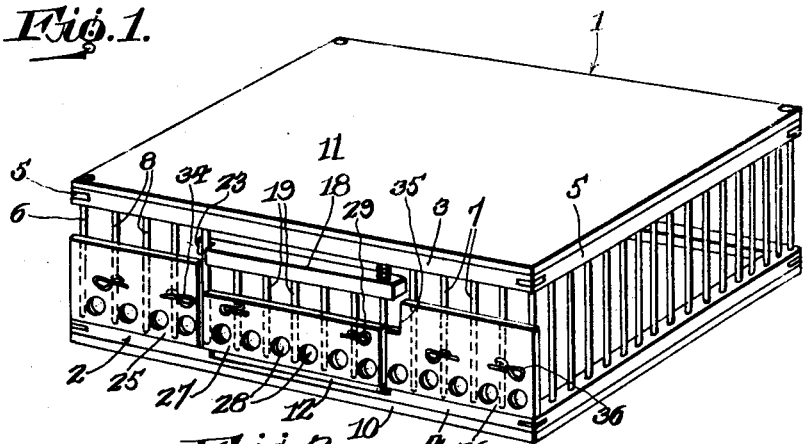
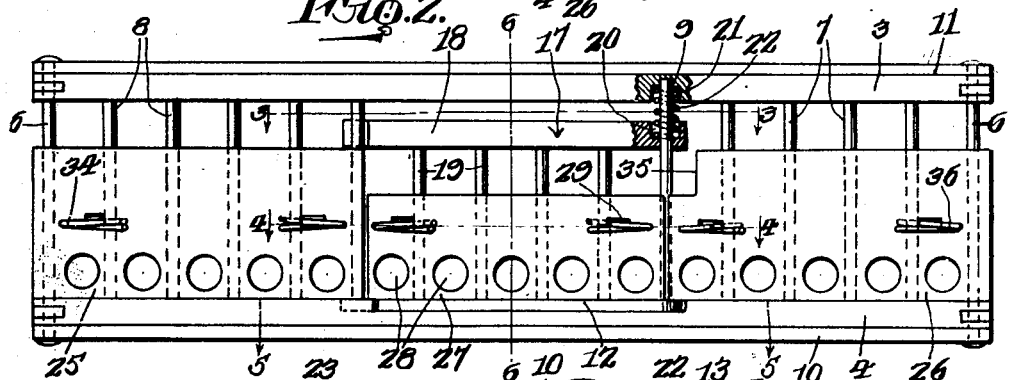
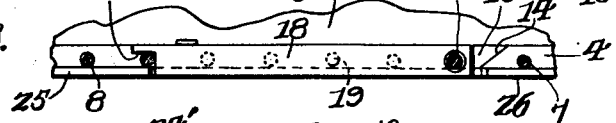
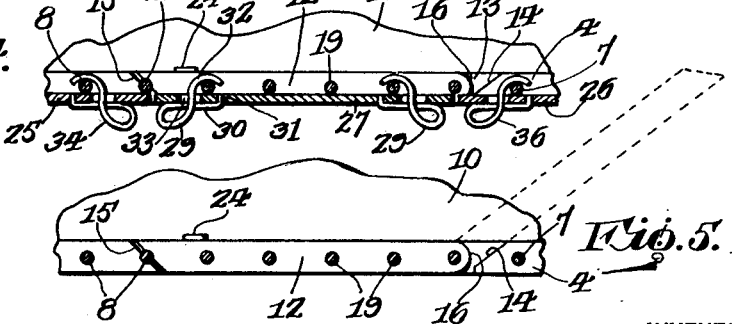
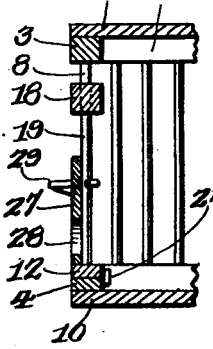
INVENTOR.
Ose F. Carpenter
BY
Geo. F. Kimmel
ATTORNEY.

Patented Jan. 5, 1932

1,840,224

UNITED STATES PATENT OFFICE

OSE F. CARPENTER, OF BRIGHTWOOD, VIRGINIA

BROODER FRONT

Application filed February 24, 1930. Serial No. 430,950.

This invention relates to a front for brooders and has for its primary object to provide, in a manner as hereinafter set forth, a brooder front formed with a door in which the lower frame member is carved out of the lower frame member of the brooder front, whereby the upper faces of the lower frame members of the front and door are flush, in order that chicks may feed through the door from a trough outside the brooder with the same efficacy as through the remaining portion of the brooder front.

A further object of the invention is to provide a brooder front formed with a door in a manner as aforesaid, whereby a material saving may be had in the material from which the door is made, and whereby a material saving in labor also may be had, as the sockets in the lower frame members of the front and door for receiving the vertical rods may be bored in one operation before the lower frame member of the door is carved out of the lower frame member of the brooder front.

A further object of the invention is to provide a brooder front formed with a door in a manner as aforesaid, wherein a stop is provided for the door when the latter is in both open and closed positions.

A further object of the invention is to provide a brooder front formed with a door in the manner aforesaid, in which adjustable and removable feeding guards are provided across the entire brooder front, including the door, whereby baby chicks will be prevented from escaping through the vertical rods, thereby permitting the positioning of the rods a sufficient distance apart to enable the chicks to feed therebetween after the chicks grow larger.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative, and that the invention is intended to be limited only by the scope of the claims hereunto appended.

In the accompanying drawings in which like numerals are employed to designate like parts throughout the several views:—

Figure 1 is a perspective view of a brooder, showing my improved front as a part thereof.

Figure 2 is a front elevation of the brooder shown in Figure 1.

Figure 3 is a fragmentary sectional plan taken on the line indicated at 3—3, Figure 2.

Figure 4 is a fragmentary sectional plan taken on the line indicated at 4—4 of Figure 2.

Figure 5 is a fragmentary sectional plan taken on the line indicated at 5—5 of Figure 2, and showing in dotted lines the lower frame member of the door in open position.

Figure 6 is a fragmentary vertical section taken on the line 6—6 of Figure 2.

Referring to the drawings in detail, the numeral 1 indicates generally a brooder of the knock-down type embodying my improved front indicated generally by the numeral 2. The front 2 includes upper and lower frame members 3 and 4 respectively which are connected together at their ends and also connected to the side frames 5 of the brooder by means of removable bolts 6. Extending between the members 3 and 4 adjacent one end of the front 2 are a plurality of spaced, vertical rods 7, and extending between the members 3, 4, adjacent the opposite end of the front 2, are a plurality of similar vertical rods 8. The ends of the rods 7 and 8 snugly extend into sockets formed in the members 3 and 4, one of such sockets being indicated at 9 in connection with the innermost of the rods 7. The lower member 4 is seated on the bottom 10 of the brooder, and the upper member 3 has the top 11 of the brooder seated thereon.

Centrally of the lower frame member 4, a strip of material 12 is sawed therefrom, whereby a recess 13 is provided in the upper face of the member 4, with the end walls 14 and 15 of the recess inclining rearwardly and outwardly and extending from the forward edge of the member 4 to the rearward edge thereof. The end wall 14 is disposed between the two innermost of the vertical rods 7, and the end wall 15 biscets the innermost of the vertical rods 8. After the strip 12 has been sawed from the frame member 4, one end of the strip is rounded as indicated at 16, and the strip 12 is utilized as the bottom frame member of a door indicated generally at 17, which is pivotally mounted on the innermost of the vertical rods 7.

The door 17 further includes an upper frame member 18 which is connected to the member 12 by means of a plurality of spaced, vertical rods 19 similar to the rods 7 and 8. Adjacent one end of the upper frame member 18, the innermost of the rods 7 extends therethrough, and formed in the upper face of the frame member 18 is a circular recess 20 to provide an annular space around such innermost rod.

Formed in the lower face of the upper frame member 3, in opposing relation to the recess 20, is a similar recess 21, which also provides an annular space around the innermost of the rods 7. Encircling the innermost of the rods 7, and having its respective ends extending into the recesses 20 and 21, is a coiled spring 22, the compression of which exerts a downward force on the door 17 to normally maintain the lower frame member 12 of the door seated upon the bottom wall of the recess 13. At the opposite end of the door, the upper frame member 18 is formed with a notch 23 which receives the innermost of the rods 8 therein when the door is in closed position. With the door in closed position, the innermost of the rods 8 is also embraced by an arcuate recess 24' in one end of the lower frame member 12. The door 17 is normally maintained in closed position by means of a latch member 24, which is preferably in the form of a staple driven into the rearward face of the member 4, and bent upwardly at a right angle to extend across a portion of the inner face of the frame member 12. When it is desired to release the door 17, the door is forced upwardly against the compression of the spring 22 until the frame member 12 clears the latch member 24, after which the door may be swung inwardly to open position. When the door is in open position, the inner face of the frame member 12 abuts the end wall 14 of the recess 13 whereby a stop is provided for limiting the opening movement of the door.

Extending across the entire length of the front 2 is a feeding guard which consists of end sections 25 and 26, and an intermediate section 27. The intermediate section 27 is carried by the door 17 and is in the form of a board having its lower edge seated on the lower frame member 12, and having its upper edge arranged in spaced relation to the lower face of the upper frame member 18.

Spaced from the lower edge thereof, the section 27 is provided with a plurality of circular openings 28 through which the heads of baby chicks may be protruded to obtain feed or water from a trough, not shown, adapted to be positioned outside of the brooder. The section 27 is secured to the rods 19 by means of a pair of spring clips 29. Each of the clips 29 is substantially in the form of a figure 8 having a portion 30 thereof abutting the outer face of the section 27 with such portion terminating in an inturned end 31 extending snugly into an opening in the section 27. The opposite end portion 32 of each clip extends through an elongated slot 33 through the section 27 and extends in a curve behind one of the rods 19 whereby the section 27 is resiliently secured against the outer faces of the rods. When the chicks within the brooder become too large to feed through the openings 28, the section 27 may be moved upwardly along the rods 19 to permit the chicks to feed under the section 27, and when the chicks become large enough to be unable to squeeze between the rods 19, the section 27 may be removed. The section 25 is the same as the section 27 except that it is of greater height in order that the upper edge of the section 25 may be spaced from the lower face of the frame member 3 a distance equal to the space between the upper edge of the section 27 and the lower face of the frame member 18. The section 25 terminates at its inner end adjacent the innermost of the rods 8 in order that the inner end of the section will clear the wall of the notch 23 when it is desired to move the section 25 upwardly upon the rods 8. The section 25 is secured to the rods 8 by means of spring clips 34 in the same manner as the section 27 is secured by means of the clips 29 heretofore described. The end section 26 is the same as the end section 25, except that the end section 26 is formed at its inner, upper corner with a recess 35 in order that the section 26 may clear the upper frame member 18 of the door when the section 26 is moved upwardly on the rods 7. The section 26 is secured to the rods 7 by means of clips 36 similar to the clips 29 and 34.

In the construction of a brooder front in accordance with this invention, the bottom frame member 4 is first formed with sockets to accommodate the lower ends of the rods 7, 8 and 19. The strip 12 is then sawed from the member 4 and one end of the strip is rounded as indicated at 16 to provide a clearance between such end of the strip and the end wall 14 of the recess 13 formed in the upper face of the member 4 by sawing the strip 12 therefrom. The rods 7, 8 and 19 then may be inserted in position and the upper frame members 3 and 18 secured in position at the upper ends of the rods.

In sawing the strip 12 from the member 4, a scroll saw preferably is employed, first kerfing the upper face of the member 4 diagonally thereof, then kerfing the member lengthwise from the diagonal kerf, and then vertically and diagonally kerfing the member from the lengthwise kerf to the upper face of the member.

It is thought that the many advantages of a brooder front in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:—

1. A brooder front comprising, upper and lower frame members formed with opposed sockets, a plurality of spaced rods having their ends inserted in said sockets for connecting the frame members, and a door pivotally mounted on one of said rods, said door including a lower frame member carved out of the lower frame member of the brooder front whereby a recess is formed in the upper face of the lower frame member of the door, said recess having diagonal end walls, one of which is disposed between a pair of said sockets, and the other of which intersects one of said sockets.

2. A brooder front comprising, upper and lower frame members, a plurality of spaced rods connecting the frame members, and a door pivotally mounted on one of said rods, said door including a lower frame member carved out of the lower frame member of the brooder front whereby a recess is formed in the upper face of the lower frame member of the brooder front, the end walls of said recess inclining outwardly and rearwardly to provide stops for the door in opened and closed positions.

3. A brooder front comprising, upper and lower frame members, a plurality of spaced rods connecting the frame members, a door pivotally and slidably mounted on one of said rods, said door including a lower frame member having its upper face flush with the upper face of the lower frame member of the brooder front, tension means normally seating the lower frame member of the door on the lower frame member of the brooder front, and a latch member driven into the lower frame member of the brooder front and bent upwardly into abutting relation with respect to the inner face of the lower frame member of the door.

4. A brooder front comprising, upper and lower frame members, a plurality of spaced rods connecting the frame members, a door pivotally mounted on one of said rods, said door including a lower frame member having its upper face flush with the upper face of the lower frame member of the brooder front, and a feeding guard extending across the entire length of the brooder front, said guard being formed in sections, one of said sections being secured to the door.

5. A brooder front comprising, upper and lower frame members, a plurality of spaced rods connecting the frame members, a door pivotally mounted on one of said rods, said door including a lower frame member having its upper face flush with the upper face of the lower frame member of the brooder front, said door further including an upper frame member, spaced rods connecting the frame members of the door, and a feeding guard extending across the entire length of the brooder front, said guard including end sections secured for vertical adjustment on the rods connecting the frame members of the brooder front, said guard further including an intermediate section secured for vertical adjustment on the rods connecting the frame members of the door.

6. A brooder front comprising, upper and lower frame members, a plurality of spaced rods connecting the frame members, a door pivotally mounted on one of said rods, said door including a lower frame member having its upper face flush with the upper face of the lower frame member of the brooder front, said door further including an upper frame member, spaced rods connecting the frame members of the door, a feeding guard extending across the entire length of the brooder front, said guard including end sections and an intermediate section, and spring clips securing the end sections to the rods connecting the frame members of the brooder front and further securing the intermediate section to the rods connecting the frame members of the door.

7. A brooder front comprising, upper and lower frame members, a plurality of spaced rods connecting the frame members, a door pivotally mounted on one of said rods, and a feeding guard extending across the brooder front, said guard being formed in sections, one of said sections being secured to the door.

8. A brooder front comprising, upper and lower frame members, a plurality of spaced rods connecting the frame members, a door pivotally mounted on one of said rods, said door including upper and lower frame members, spaced rods connecting the frame members of the door, and a feeding guard extending across the brooder front, said guard including end sections secured for vertical adjustment on the rods connecting the frame members of the brooder front, said guard further including an intermediate section secured for vertical adjustment on the rods connecting the frame members of the door.

9. A brooder front comprising, upper and lower frame members, a plurality of spaced rods connecting the frame members, a door pivotally mounted on one of said rods, said door including upper and lower frame members, spaced rods connecting the frame members of the door, a feeding guard extending across the brooder front, said guard including end sections and an intermediate section, and spring clips securing the end sections to the rods connecting the frame members of the brooder front and further securing the intermediate section to the rods connecting the frame members of the door.

10. A brooder front comprising, upper and lower frame members, a plurality of spaced rods connecting the frame members, a door pivotally and slidably mounted on one of said rods, said door including upper and lower frame members, the lower frame member of the door being carved out of the lower frame member of the brooder front, tension means between the upper frame member of the brooder front and door for yieldingly seating the latter against the lower frame member of the brooder front, and a staple driven into the lower frame member of the brooder front and bent upwardly to engage the lower frame member of the door when the latter is seated.

In testimony whereof, I affix my signature hereto.

OSE F. CARPENTER.